United States Patent [19]

Morgan

[11] Patent Number: 4,974,866
[45] Date of Patent: Dec. 4, 1990

[54] TRAILER HITCH GUIDE FOR STEP-TYPE BUMPERS

[76] Inventor: William J. Morgan, P.O. Box 398, Spring City, Tenn. 37381

[21] Appl. No.: 483,253

[22] Filed: Feb. 22, 1990

[51] Int. Cl.$^5$ ............................................. B60D 1/40
[52] U.S. Cl. .................................................. 280/477
[58] Field of Search ................... 280/477, 479.1, 479.2, 280/479.3, 481

[56] References Cited

U.S. PATENT DOCUMENTS

| | | | |
|---|---|---|---|
| 4,840,392 | 6/1989 | Baskett | 280/477 |
| 4,871,184 | 10/1989 | Johnson | 280/477 |
| 4,871,185 | 10/1989 | Chakroff et al. | 280/477 |

Primary Examiner—Mitchell J. Hill
Attorney, Agent, or Firm—Alan Ruderman

[57] ABSTRACT

A trailer hitch guide for use in guiding a trailer hitch socket onto a cooperating hitch ball mounted on the platform of the recess in a step-type bumper of a vehicle for towing the trailer. The guide has a plate from a first surface of which a pair spaced apart guide walls extend, the guide walls having a first portion extending substantially normal to the plate and a second portion diverging away from the space between the guide walls. The plate carries a pair of threaded connecting members which act to connect the plate to the riser wall of the recess, and a pair of threaded abutment members which act to abut the riser wall. The connecting members and the abutment members are adjusted to position the plate against a pair of stop members secured to the platform spaced from the hitch ball, the stop members being located so that when the plate engages the stop members a trailer hitch entering the space between the guide walls and just touching the plate will be properly located for coupling with the ball. The plate may be removed and stored after each use.

8 Claims, 2 Drawing Sheets

TRAILER HITCH GUIDE FOR STEP-TYPE BUMPERS

BACKGROUND OF THE INVENTION

This invention relates to trailer hitches and more particularly to a trailer hitch guide accessory for a vehicle having a step-type bumper, the guide being readily attachable to the bumper for use during the hitching operation and removable therefrom once the socket of the trailer hitch has been secured to the ball on the towing vehicle.

Guides for directing the socket of a trailer hitch onto a towing ball mounted on the bumper of a vehicle are well known in the prior art. These guides include either a U-shaped wall member or a pair of angularly disposed wall members against which the socket end of the trailer hitch abuts and is thereby directed toward a central portion where the associated ball of the towing vehicle is disposed on the rear bumper, the trailer hitch being guided as the vehicle is backed up toward the trailer hitch. Most of these guide members are nonremovably fastened to the vehicle and thereby create an unattractive external protuberance on the vehicle and is subjected to continuous contact with weather and other environmental elements which may require additional maintenance. Examples of these and related hitch guides are disclosed in the following U.S. Patents: Stallsworth U.S. Pat. No. 4,854,604; Vinchattle U.S. Pat. No. 4,666,177; Eichels et al. U.S. Pat. No. 3,773,356; Morton U.S. Pat. No. 1,665,817 and Williams U.S. Pat. No. 1,626,993. Additionally, none of these hitch guides are readily usable with step bumpers which are the type generally used on modern pick-up trucks.

Most currently manufactured pick-up trucks have bumpers which are selected as an option, and generally most are selected with a flat step formed thereon so that access into the bed of the vehicle can be readily obtained by stepping onto the step portions of the bumper. The step portions are separated by a recess, which has a rear wall or riser which is the location where the license plate or tag of the vehicle is mounted, and a platform to which the ball hitch is mounted. Thus, if the hitch guide is permanently attached to the bumper the license plate or tag must be relocated to another position to prevent its being obscured by the known guides. For example, Schwartz et al. U.S. Pat. No. 4,781,394 and Dortch U.S. Pat. No. 4,417,748 both disclose permanently mounted trailer hitch guides in the recess of the step bumper. Thus, not only are these guides constantly subjected to environmental conditions etc., but they also require relocation of the license plate to a less convenient location.

This problem was recognized to a certain extent in Webb et al. U.S. Pat. No. 4,844,496 wherein a removable trailer hitch guide is described. The shortcoming involved with that hitch guide is that it is not adjustable and, because of the construction of the guide when the vehicle is backed-up toward the trailer hitch, if the vehicle backs too far, the trailer hitch socket end, which is initially disposed above the ball, may ram into the upstanding wall in the step and damage the license plate and the bumper. Moreover, all of the known step-type bumpers have a hole formed in the platform of the recess for receiving the shank of a hitch ball. However, the holes in the bumpers manufactured by various manufacturers vary in distance from the riser or rear upstanding wall in the recess from approximately one and one-half to three and one-half inches. Accordingly, for a trailer hitch guide to be useful with step-type bumpers, not only should the guide be removable, but additionally, in order to be universally adapted for use with substantially all of the known bumpers, the guide should have the capability of being adjustably mounted thereon.

SUMMARY OF THE INVENTION

Consequently, it is a primary object of the present invention to provide a trailer hitch guide which is universally adapted for use in conjunction with substantially all of the known bumper mounted hitch balls for guiding a trailer hitch into cooperative relationship with the hitch ball on the bumper.

It is another object of the present invention to provide a trailer hitch guide that can be removably and selectively connectable within and removable from the recess of a step bumper of a tow vehicle about a hitch ball secured on the bumper, the guide being used during the hitching operation and removable once the trailer is coupled to the ball.

It is a further object of the present invention to provide a trailer hitch guide that is positionable within the recess of a step bumper about a hitch ball fastened on the platform of the recess, the hitch guide having adjustment means for permitting its use with such bumpers independently of the spacing of the ball from the upstanding riser wall of the recess.

Accordingly, the present invention provides a trailer hitch guide for use in guiding a trailer hitch socket onto a cooperating hitch ball mounted on the bumper of a vehicle for towing the trailer, the guide comprising a plate to which the walls of a guide channel extend, the channel being disposed about the hitch ball when the hitch guide is connected to the bumper so that the towing vehicle may be backed into the trailer hitch for coupling the ball and socket. The plate includes connecting means in the form of a pair of fasteners for securement to an upstanding wall of the bumper spaced from the ball, and carries abutment means for abutting the upstanding wall and for forcibly positioning the plate away from the wall against stop means disposed on the bumper, the stop means being located such that the plate is positioned relative to the ball hitch at a disposition such that when the free end of the trailer hitch is closely adjacent the wall, the socket is above the ball. The trailer hitch may thereafter be lowered and the socket enclosed and locked about the ball. The fasteners may thereafter be disconnected from the wall and the abutment means released so that the hitch guide may be removed from the bumper and stored for use the next time the trailer is to be hitched to the towing vehicle.

In the preferred form of the invention the guide channel comprises a pair of spaced apart primary walls having respective ramps diverging away from each other, the ramps acting to direct the end of the trailer hitch inwardly toward the space between the primary walls. Additionally, the fasteners and the abutment members may be members threadedly connected to the plate, the fasteners further being threaded into holes in the upstanding wall of the bumper while the abutment members are merely adjusted into contact with the wall.

During the initial installation of the guide hitch the primary walls are disposed so that the ball hitch is located in the center of the space therebetween and spaced from the plate a distance such that the free end of the trailer hitch slightly touches o grazes the plate when the socket is above the ball. This may be done by threading the fasteners into the wall and adjusting the abutment members so that the plate is properly positioned relative to the ball hitch. The stop members may thereafter be installed adjacent the surface of the plate remote from the wall. Once this initial set-up is made, whenever the hitch guide is to be used, it may be readily installed by connecting the fasteners and positioning the abutment members such that the surface of the plate remote from the wall contacts the stop members.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
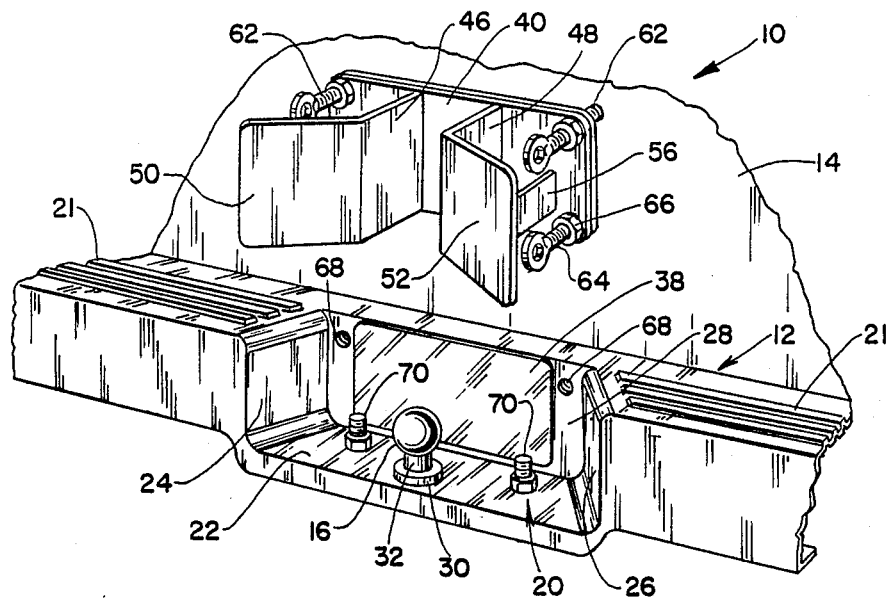
FIG. 1 is a fragmentary perspective view of the bumper of a tow vehicle and a hitch guide constructed in accordance with the principles of the present invention positioned for mounting on the bumper.
Figure 2:
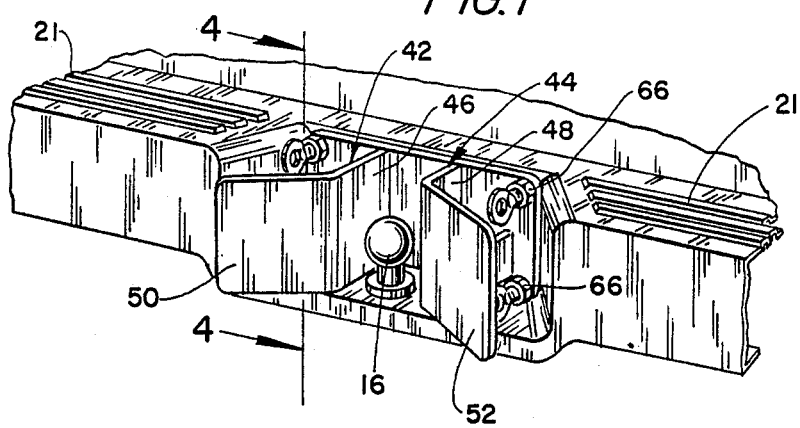
FIG. 2 is a perspective view illustrating the hitch guide disposed in the operative position.
Figure 3:
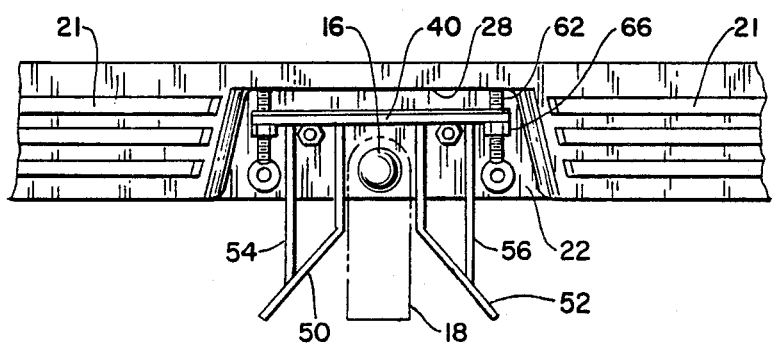
FIG. 3 is a top plan view of the hitch guide in the operative position.
Figure 5:
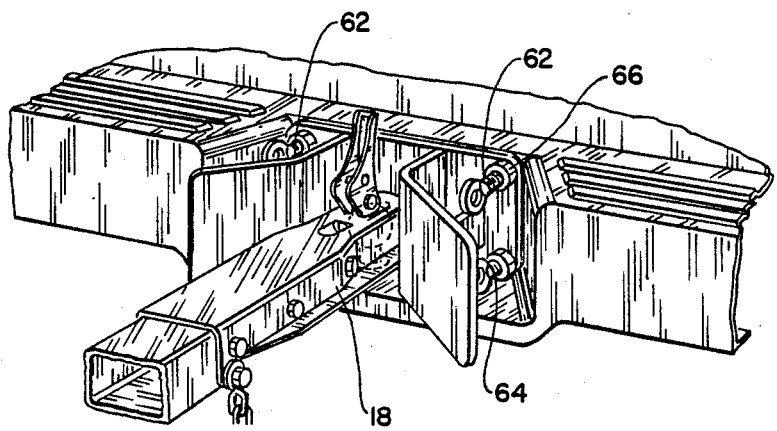
FIG. 5 is a view similar to FIG. 2 but with the trailer hitch located on the ball hitch.

Referring now to the drawings, a trailer hitch guide generally indicated at 10 constructed in accordance with the present invention is illustrated in FIG. 1 in a pre-mounting disposition relative to the bumper 12 at the rear of a vehicle 14 such as a pick-up truck or the like. Mounted securely on the bumper 12 is a ball hitch 16 for coupling to a socket member (not illustrated) within the free end of a conventional trailer boom 18 illustrated in FIGS. 3 and 5. As aforesaid, such bumpers have a recess, generally indicated at 20, intermediate the step-on portions 21 of the bumper, the recess comprising a substantially horizontal platform 22 extending from the rear exterior end of the bumper inwardly of a pair of vertical lateral walls 24, 26, to an upstanding wall or riser 28 formed inwardly from the rear exterior end, the platform functioning for mounting the ball hitch, while the portions 21 provide a person with ready access into the bed of a pick-up truck. Thus, the ball hitch 16 is mounted in the platform 22, the ball having an integral collar 30 positioned on the step and a shank 32 extending through a hole in the step. The shank has threads 34 beneath the collar 30 so that it may be threadedly attached within a nut 36 at the underside of the platform to secure the ball hitch to the bumper. As aforesaid, the spacing from the ball 16 to the wall 28 varies with the different manufacturers. Moreover, the riser 28 is the conventional mounting location of the license plate 38 for the vehicles so that the license plate is obscured by those prior art hitch guides that are fixedly attached to the bumper and require relocation to a less convenient position.

The hitch guide 10 of the present invention comprises a substantially rectangular support plate 40 preferably slightly longer than the license plate but sized to fit within the area of the wall 28, and two spaced apart guide members 42, 44. The guide members comprise respective primary walls 46, 48 also in the form of rectangular plates which extend orthogonally from the support plate 40, these walls being spaced apart by a distance which is slightly more than the width of the leading edge of conventional trailer hitch booms 18 within which the coupling socket is disposed, and a respective ramp 50, 52 diverging relative to each other away from the space between the primary walls 46, 48 at an obtuse angle to the respective primary wall. Preferably the support plate 40 and the guide members 42, 44 are formed from steel, aluminum or other high strength light weight material and the guide members may be welded, brazed or otherwise bonded to the support plate 40. In the operative position, the support plate 40 and the guide members 42, 44 are disposed vertically so that the ramps 50, 52 act as camming surfaces to direct or funnel the leading edge of a trailer hitch boom into the space between the primary walls 46, 48 as the vehicle on the which the hitch guide 10 is mounted is backed-up toward the trailer hitch. To add additional support against bending forces applied by the trailer hitch to the guide members, bracing strips 54, 56 or the like of the same material may be secured to and extend between the support wall 40 and the facing surface of the ramps 50, 52.

Figure 4:
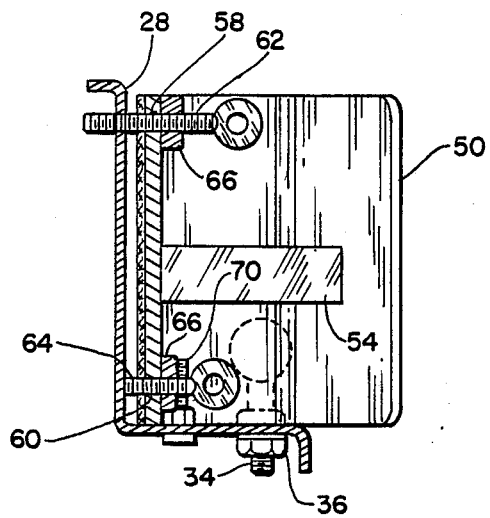
FIG. 4 is a vertical cross sectional view taken substantially along line 4—4 of FIG. 2.

Formed through the upper portion of the support plate 40 preferably adjacent each upper corner is a bore 58 best illustrated in FIG. 4, while a similar bore 60 is formed through the lower portion preferably adjacent each lower corner. These bores are tapped to threadedly receive respective upper and lower threaded members 62, 64 and, to provide greater thread engaging surfaces without making the wall 40 excessively thick, nuts or the like 66 sized to receive the members 62, 64 may be fixedly secured, as by welding or the like, to the support wall 40 with the axes of the nuts aligned with the respective bores 58, 60. Thus, the members 62 and 64 may be threaded through the respective nuts 66 and the wall 40. The upper member 62 are fasteners adapted for being threadedly received into respective threaded holes 68 formed and tapped through the upstanding riser wall 28 of the bumper at dispositions such that when the fasteners are received within the holes 68, the center of the space between the primary walls 46, 48 is aligned with a plane extending through the axis of the ball which is substantially perpendicular to the plate 40. The lower members 64 are abutment members adapted to abut the surface of the wall 28.

Since the disposition of the support plate 40 relative to the wall 28 is determined by the location of the ball hitch 16 relative to the wall 28 and, as aforesaid, this distance varies with the different manufacturers, provision is made for locating means in the form of stop members 70 so that the hitch guide 10 of the present invention may be utilized with substantially all of the known bumper hitches. The stop members 70 may merely be a pair of spaced apart studs, such as bolts or the like fastened as by nuts to the recess platform 22 at a disposition wherein they engage the surface of the support plate 40 remote from the wall 28 when that surface of the support plate is spaced from the ball 16 by an amount such that when the leading end of the trailer boom 18 just touches the plate 40, the socket within the trailer hitch is disposed for receiving the ball hitch 16. When a nut and bolt arrangement is used, as illustrated, the periphery of the nut will provide the stop member surface. This disposition of the stop members is readily made when initially setting up the hitch guide for use with a particular bumper. For example, after the holes 68 are drilled and tapped the trailer hitch socket may be coupled to the ball 16 and the hitch guide then placed in position adjacent the wall 28. The fasteners 62 and the abutment members may then be adjusted until the surface of the plate 40 just touches, grazes or is slightly spaced from the leading end of the trailer boom 18. The platform 22 may then be marked for locating the stop members 70. The hitch guide 10 may then be removed, the trailer unhitched and the stop members installed in holes drilled for this purpose. Alternatively, proper measurements may be made from the leading end of the trailer hitch boom to the wall 28 when the trailer is hitched to the vehicle, this distance being the same as that between the disposition of the periphery of the stop member and the wall 28. Adding the radius of the stud or nut, as the case may be, to this distance provides the location of the axis of each stud. As an alternative to the use of the stop member 70, the fasteners 62 of the abutment members 64 may be marked with paint or the like when the plate is properly located, and therefor the fasteners and stop members may be threaded with the plates to the depth of the marked locations.

Once the stop member studs are installed, the hitch guide 10 may be readily installed each time the trailer is to be hitched to the tow vehicle. This merely involves positioning the fasteners 62 within the respective hole 68 and adjusting the fasteners and the abutment members 64 until the plate 40 is both secured to the wall 28 and in engagement with the stop members 70. When so positioned, the tow vehicle need only back-up to the trailer hitch until the leading end of the boom 18 is guided into the space between the walls 46 and 48 and is just slightly spaced from or just touching the support wall 40. The socket of the trailer may then be lowered and coupled to the ball hitch 16, and the hitch guide 10 may thereafter be removed and be stored for subsequent use.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A trailer hitch guide for use in combination with the bumper of a tow vehicle having a recess formed therein, said recess comprising a platform and an upstanding riser wall, said guide adapted for guiding a trailer hitch into cooperative relationship with a coupling ball secured to said platform, said hitch guide comprising a plate of a size no larger than said riser wall, a pair of laterally spaced apart guide walls defining a guide channel therebetween, each of said guide walls comprising a primary wall secured to a first surface of said plate and a ramp diverging outwardly from the space between the guide walls and terminating at a free end, said primary walls being spaced apart by an amount permitting a trailer hitch coupled to said ball to be received therebetween, adjustable connecting means carried by said plate and adapted for adjustably fastening said plate to said upstanding riser wall with said first surface facing remotely from said riser wall and at a lateral disposition locating said ball substantially centrally intermediate to said primary walls, and adjustable abutment means carried by said plate for adjustably abutting said riser wall and acting in conjunction with said connecting means to position said plate relative to said ball at a predetermined location permitting said ball and said trailer hitch to couple when said trailer hitch grazes said plate, whereby said trailer hitch guide may be adjustably attached to said bumper when needed and removed after said trailer is hitched to said ball.

2. A trailer hitch guide as recited in claim 1, wherein said connecting means and said abutment means comprise members threaded through said plate, said connecting means being threadedly received in said riser wall, and said abutment means abutting said riser wall.

3. A trailer hitch guide as recited in claim 1, wherein each primary wall is planar and extends orthogonally from said plate, and each of said ramps is planar for guiding the trailer hitch into the space between said primary walls and said plate.

4. In combination with a bumper of a tow vehicle having a recess comprising a platform and an upstanding riser wall, a coupling ball secured to said platform, and stop means secured to said platform intermediate said ball and said riser wall, a trailer hitch guide adapted for guiding a trailer hitch into cooperative relationship with said ball, said hitch guide comprising a plate of a size no larger than said riser wall, a pair of laterally spaced apart guide walls defining a guide channel therebetween, each of said guide walls comprising a primary wall secured to a first surface of said plate and a ramp diverging outwardly from the space between the guide walls and terminating at a free end, said primary walls being spaced apart an amount permitting a trailer hitch coupled to said ball to be received therebetween, adjustable connecting means carried by said plate and adapted for adjustably fastening said plate to said upstanding riser wall with said first surface facing remotely from said riser wall and at a lateral disposition locating said ball substantially centrally intermediate said primary walls, and adjustable abutment means carried by said plate for abutting said riser wall and acting in conjunction with said connecting means to adjustably position said first surface of said plate into contact with said stop means, said stop means being disposed at a location permitting said ball and said trailer hitch to couple when said trailer hitch grazes said first surface of said plate.

5. In the combination as recited in claim 4, wherein each primary wall is planar and extends orthogonally from said plate, and each of said ramps is planar for guiding the trailer hitch into the space between said primary walls and said plate.

6. In the combination as recited in claim 4, wherein said connecting means and said abutment means comprise members threaded through said plate, said connecting means being threadedly received in said riser wall, and said abutment means abutting said riser wall.

7. In the combination as recited in claim 6, wherein each primary wall is planar and extends orthogonally from said plate, and each of said ramps is planar for guiding the trailer hitch into the space between said primary walls and said plate.

8. In the combination as recited in claim 7, wherein said stop means comprises a pair of upstanding members extending from said platform at spaced apart dispositions relative to said ball.

* * * * *